United States Patent [19]

Satgurunathan et al.

[11] Patent Number: 5,547,710
[45] Date of Patent: Aug. 20, 1996

[54] AQUEOUS COATING COMPOSITIONS

[75] Inventors: Rajasingham Satgurunathan, Kingsley; David C. Hinde, Wirral; John C. Padget, Frodsham; John G. Carey, Warrington, all of England

[73] Assignee: Zeneca Limited, London, England

[21] Appl. No.: 295,861

[22] PCT Filed: Mar. 5, 1993

[86] PCT No.: PCT/GB93/00468

§ 371 Date: Nov. 3, 1994

§ 102(e) Date: Nov. 3, 1994

[87] PCT Pub. No.: WO93/18075

PCT Pub. Date: Sep. 16, 1993

[30] Foreign Application Priority Data

Mar. 11, 1992 [GB] United Kingdom ............... 9205272
Nov. 19, 1992 [GB] United Kingdom ............... 9224289

[51] Int. Cl.⁶ .................................................. B05D 3/02
[52] U.S. Cl. ............... 427/386; 427/393; 427/393.6; 428/500; 523/410; 523/411; 523/412; 525/123; 525/175; 525/176
[58] Field of Search ............................. 427/386, 393, 427/393.6; 428/500; 523/410, 411, 412; 525/123, 175, 176

[56] References Cited

U.S. PATENT DOCUMENTS 4,933,213  6/1990  Fourquier et al. .

5,281,655  1/1994  Mitsuji et al. ........................ 524/507

FOREIGN PATENT DOCUMENTS 0267554  5/1988  European Pat. Off. .
0508536  10/1992  European Pat. Off. .
60-18911  9/1985  Japan .
2045768  11/1980  United Kingdom .

OTHER PUBLICATIONS

Abstracts of Japanese Patent Nos. 70–028999, Jun. 1967, 52–146453, Dec. 1977, 60–156769, Aug. 1985.

Chemical Abstracts, vol. 100, No. 8, abstract No. 53325, "Primer coatings for polyester magnetic tapes", p. 96 see abstract JP,A, 58 124 561, Jul. 25, 1983.

Chemical Abstracts, vol. 104, No. 22, abstract No. 187718, "Electrophoretic coatings in manufacture of insulated wires", p. 60, see abstract & JP,A,60 189 119, Sep. 26, 1985.

*Primary Examiner*—Melvyn I. Marquis
*Assistant Examiner*—D. Aylward
*Attorney, Agent, or Firm*—Cushman Darby & Cushman, LLP

[57] ABSTRACT

Aqueous curable polymer dispersion comprising a polyester and/or polyurethane and a polymeric product having a Tg from 25°–100° C. obtainable by free-radical polymerisation of a mixture of (a) an olefinic monomer free from epoxy and epoxy reactive groups, (b) a monomer and/or oligomer having at least two epoxy groups and (c) a group reactive towards epoxy groups.

22 Claims, No Drawings

AQUEOUS COATING COMPOSITIONS

This invention relates to crosslinkable aqueous coating dispersions in which the basis of the crosslinkability is provided by the reaction in an applied coating between epoxy groups and certain polymer-bound epoxy-reactive groups.

Polymeric film coatings are well established in the technology of protection of surfaces, and are frequently required to become cross-linked for certain applications. Thermal curing (often referred to as storing) is widely used, especially in the case of melamine-formaldehyde cured coating systems. However, such systems suffer the disadvantage of release of formaldehyde on curing. They also require a high storing temperature (typically about 150° C.) which can be somewhat reduced by use of strong acid catalysts but at the expense of impairment of the coating performance. Such disadvantages are overcome by the present invention.

Epoxy-cured aqueous coating systems in which epoxy groups and epoxy-reactive groups are present in separate particles of an aqueous dispersion are known from PCT Application No. WO91/14715 and U.S. Pat. No. 4,367,298. However, these are expensive to produce and present difficulties in the maintenance of storage stability.

When high temperature applications are envisaged for coating dispersions, as for example in the coating of heated substrates, a relatively high minimum film forming temperature (MFT) for the dispersion can be tolerated, provided that such MFT is the same as, or less than, the temperature of the substrate. This is quite a common situation for storing applications on metallic substrates. However, in low temperature applications, for example room temperature, it is necessary to depress the MFT of the coating composition, for example by the addition of a co-solvent (acting as a coalescing solvent). However, care is required in the choice of such MFT depressants. A cosolvent which partitions strongly in the polymer phase of the aqueous polymer dispersion can itself depress the glass transition temperature (Tg) of the polymer in the dispersed particles and which therefore, in certain instances (notably when the depressed polymer glass transition temperature is lower than the storage temperature to which the dispersion is exposed), may lead to premature cross-linking in the polymer system.

We have discovered that certain water-soluble or water-dispersible polymers are particularly effective in suppressing the MFT of crosslinkable compositions without significantly affecting the storage stability thereof.

According to the present invention there is provided an aqueous curable polymer dispersion which comprises a polyester and/or polyurethane and a polymeric product having a Tg within the range 25° C. to 100° C. obtainable or obtained by subjecting to a free-radical-initiated polymerisation process a mixture comprising the components:

(a) at least one polymerisable olefinically unsaturated monomer which does not have an epoxy-functional group or an epoxy-reactive group or a group which is subsequently converted to an epoxy-reactive group;

(b) at least one polymerisable olefinically unsaturated monomer having at least one epoxy-functional group and/or at least one multi-functional epoxy compound having an average of 2 or more epoxy groups per molecule and which is not derived from the polymerisation of an olefinically unsaturated monomer system: and (c) at least one olefinically unsaturated monomer having one or more of the following:

(i) at least one carboxyl group such that epoxy-reactive carboxyl groups are provided directly in the resulting polymeric product and/or such that epoxy-reactive amine groups are provided in the resulting polymeric product by conversion subsequent to polymerisation of at least some of the carboxyl groups to epoxy-reactive amine groups;

(ii) at least one hydroxyl group such that epoxy-reactive hydroxyl groups are provided directly in the resulting polymeric product; and (iii) at least one blocked amine group which is deblocked subsequent to polymersiation to provide epoxy-reactive amine groups in the resulting polymeric product: and wherein (d) the level of component (b) based on the sum of components (a), (b), and (c), is from 2 to 48 weight %, preferably from 5 to 30 weight % and more preferably from 10 to 25 weight %;

(e) the level of component (a) based on the sum of components (a), (b), and (c) is from 50 to 96 weight %, preferably from 60 to 80 weight %; and (f) the level component (c) based on the sum of components (a), (b), and (c) is from 2 to 40 weight % preferably from 5 to 25 weight %.

The aqueous curable polymer dispersion preferably comprises from 5% to 70% by weight (relative to the weight of polymeric product) of the polyurethane and/or polyester, more preferable 15% to 60%, especially 20% to 50% by weight.

The polymeric product preferably has a Tg within the range from 30° C. to 90° C., more preferably 35° C. to 70° C.

The polyesters and polyurethanes are dissolved or dispersed in the aqueous curable polymer dispersion. The polyesters and polyurethanes may be rendered water-soluble or water-dispersible by arranging for suitable ionic and/or non-ionic groups to become incorporated into their polymeric structure as a result of using appropriate monomers during their synthesis. Preferred ionic groups are carboxylate and sulphonate groups (made, for example, by neutralising polymer bound carboxyl or sulphonic acid groups) and preferred non-ionic groups include polyoxyethylene oxide chain-containing groups.

The polyesters may be prepared by methods known per se comprising, for example, the condensation of appropriate carboxy or sulpho containing monomers and hydroxy containing monomers.

The polyester may be prepared by polymerisation of polycarboxylic acid and/or their ester forming derivatives and polyols, preferably in the presence of a catalyst and with the removal of water and/or alcohol formed during the polymerisation.

As examples of polycarboxylic acids and their ester forming derivatives there may be mentioned C4 to C20 aliphatic, alicyclic and aromatic di- and tri-carboxylic acids (or higher functionality acids) or their ester forming derivatives (such as anhydrides, acid chlorides, and lower alkyl esters). Specific examples include adipic acid, fumaric acid, maleic acid, succinic acid, iraconic acid, sebacic acid, nonanedioic acid, decandioic acid, 1,4-cyclohexanedicarboxylic acid, 1,3-cyclohexane dicarboxylic acid, 1,2-cyclohexanedicarboxylic acid, terephthalic acid, isophthaiic acid, phthalic acid and tetrahydrophthalic acid. Anhydrides include succinic, maleic, phthalic, tetrahydrophthalic acid and hexahydrophthalic and trimellitic anhydrides.

Similarly there are a great number of polyols which may be used in polyester synthesis for the provision of the hydroxyl component. The polyol(s) preferably have from 2 to 6 (especially 2 to 4) hydroxyl groups per molecule. Suitable polyols with two hydroxyl groups per molecule include 1,6-hexanediol, 2,2-dimethyl-1,3-propanediol (neopentyl glycol), and diols such as alkoxylated bisphenol A products, e.g. ethoxylated or propoxylated bisphenol A. Dimethylol propionic acid (DMPA) can also be considered as a polyol with two hydroxyl groups per molecule even though it also contains a sterically hindered carboxyl group. Suitable polyols with three hydroxyl groups per molecule include triols such as trimethylolpropane (1,1,1-tris(hydroxmethyl)ethane). Suitable polyols with four or more hydroxy groups per molecule include pentaerythritol (2,2-bis(hydroxymethyl) 1,3-propanediol) and sorbitol (1,2,3,4, 5,6-hexahydroxyhexane).

The polyurethanes containing carboxyl groups may be prepared by reacting organic polyisocyanate with an organic compound containing at least 2 isocyanate reactive groups, e.g. a polyol, preferably in the presence of a diluent.

The isocyanate terminal prepolymer may be prepared by condensation polymerisation of an isocyanate and a polyol, for example one of the aforementioned polyols, or a glycol, for example ethylene glycol, propylene glycol, diethylene glycol, neopentyl glycol, 1,4-butanediol, furan dimethanol, cyclohexane dimethanol, glycerol, trimethylolpropane, pentaerythritol and mixtures thereof. The condensation is preferably performed in an organic solvent and/or vinyl monomer, followed by neutralisation of any acid groups and dispersion in water.

The preferred isocyanates are aliphatic, cycloaliphatic and aromatic isocyanates. Examples of suitable isocyanates include ethylene diisocyanate, 1,6-hexamethylene diisocyanate, isophorone diisocyanate, cyclohexane-1,4-diisocyanate, 4,4-dicyclohexyimethane diisocyanate, p-xylylene diisocyanate, 1,4-phenylene diisocyanate, 2,4-toluene diisocyanate, 2,6-toluene diisocyanate, 4,4-diphenylmethane diisocyanate, 2,4-diphenylmethane diisocyanate, polymethylene polyphenyl polyisocyanates and 1,5-naphthylene diisocyanate. Mixtures of isocyanates can be used and also isocyanates which have been modified by the introduction of urethane, allophanate, urea, biuret, carbodiimide, uretonimine or isocyanurate residues.

The polyurethane may be prepared by chain extension of an isocyanate terminal prepolymer using an active hydrogen containing extender, for example a polyol, an amino alcohol, ammonia, an amine or optionally substituted hydrazine.

Examples of suitable polyurethanes include those sold by ZENECA Limited under Trade Mark "NEOREZ".

The free radical initiated polymerisation process may be performed by emulsion polymerisation, by suspension polymerisation or by the dispersion in water of a preformed free-radically polymerised polymer made using any polymerisation technique (but usually aqueous emulsion polymerisation). One such emulsion polymerisation technique is core/shell (sequential) polymerisation. Emulsion polymerisation is preferably carried out at temperatures between 30° C. and 95° C. more preferably between 50° C. and 90° C.

Component (a)

Preferred polymerisable olefinically unsaturated monomers which do not have epoxy-functional groups or epoxy-reactive groups, or groups which are subsequently converted to epoxy-reactive groups, comprise certain olefine monomers, vinylidene aromatic monomers, unsaturated carboxylic acid ester monomers, vinyl ester monomers and combinations thereof.

Examples of such monomers include 1,3-butadiene, isoprene, styrene, divinyl benzene, acrylonitrile, methacrylonitrile, vinyl halides such as vinylidene chloride and vinyl chloride, vinyl esters such as vinyl acetate, vinyl propionate and vinyl laurate, heterocyclic vinyl compounds, alkyl esters of mono-olefinically unsaturated dicarboxylic acids (such as di-n-butyl maleate and di-n-butyl fumarate) and, in particular, esters of acrylic acid and methacryiic acid of formula $$CH_2=CR^1COOR^2$$

where $R^1$ is H or methyl and $R^2$ is alkyl of 1 to 20 carbon atoms (more preferably 1 to 6 carbon atoms) or cycloalkyl (especially cyclopentyl or cyclohexyl). Examples of esters of acrylic and methacrylic acid include methyl acrylate, methyl methacrylate, ethyl acrylate, ethyl methacrylate, n-butyl acrylate, n-butyl methacrylate, isopropyl acrylate, isopropyl methacrylate, n-propyl acrylate, n-propyl methacrylate, cyclohexyl acrylate and cyclohexyl methacrylate.

In one embodiment component (a) is a polymerisable olefinically unsaturated monomer which does not have any epoxy-functional group or an epoxy-reactive group.

Component (b)

The polymerisable olefinically unsaturated monomers having at least one epoxy-functional group are preferably selected from (i) alpha beta-ethylenically unsaturated acid esters of epoxidised aliphatic and cycloaphatic alcohols, in particular glycidyl acrylate, glycidyl methacrylate, 3,4 -epoxycyclohexyl methyl acrylate and/or cyclohexyl methyl methacrylate and/or (ii) allyl and vinyl esters of epoxidised aliphatic and cycloaliphatic acids, in particular allyl glycidyl ether, allyl or vinyl 3,4-epoxycyclohexane carboxylate.

The multifunctional epoxy compound having an average of 2 or more epoxy groups is preferably soluble in any of the olefinically unsaturated monomers (i.e. in Component (a) and/or (c)) and preferably miscible in the resulting polymeric product.

The epoxy group(s) of the olefinically unsaturated monomer(s) of component (b), if present, provide epoxy functionality in the resulting polymer. Alternatively, or additionally, the epoxy groups of the multi-functional epoxy compound of (b) (not derived from olefinic polymerisation), if present may also provide epoxy functionality in the resulting aqueous dispersion by becoming incorporated (it is believed) into the polymeric product.

The multifunctional epoxy compounds of component (b) containing an average of two or more epoxy groups are, if used, preferably those derived from: Bisphenol A and epichlorhydrin; "Novalak" resins and epichlorhydrin, for example, trimethylal propane triglycidyl ether. Other useful epoxides are glycidyl ethers or esters of cycloaliphatic epoxides.

Component (c)

The component (c) provides epoxy-reactive functionality in the resulting polymeric product either directly or indirectly. Direct provision of epoxy-reactive functionality may be achieved by the use of a carboxyl and/or hydroxy group-functional monomer, any carboxyl groups in the resulting polymer being left wholly unconverted to amine groups, or only a proportion of them being converted to amine groups (carboxyl groups are of course epoxy-reactive groups in their own right). Indirect provision of epoxy-reactive functionality may be achieved by using a carboxyl functional and/or amine-blocked functional comonomer and subsequent to polymerisation effecting conversion of such groups to amine groups. For example, a carboxyl functional monomer can be incorporated into a polymer to give a carboxyl functional polymer and the resulting carboxyl functional polymer can be reacted with propylene imine (i.e. iminated) to give an amine functional polymer. Alternatively, a monomer having blocked amine groups can be used, and these blocked amine groups in the polymer so formed can be subsequently deblocked to generate the amine functional polymer.

Preferred olefinically unsaturated monomers having a carboxyl group include (i) alpha beta-unsaturated carboxylic acids, for example acrylic acid, methacrylic acid and itaconic acid (ii) carboxylic acid derivatives of alpha beta-unsaturated esters; addition products of hydroxyalkyl acrylates and methacrylates to arthydrides, for example, a hexylethyl acrylate additive product with succinic or maleic anhydride: addition products of alpha beta unsaturated acids to lactones; (iii) carboxylic acid derivatives of alpha beta-unsaturated amides, for example, 3-acrylamido-3-methyl butanoic acid and 10-acrylamido-undecanoic acid; (iv) unsaturated aliphatic and cycloaliphatic carboxylic acids.

Preferred olefinically unsaturated monomers having at least one hydroxyl functional group include (i) alpha beta unsaturated ester derivatives containing OH groups, for example hydroxymethyl acrylate, hydroxyethyl methacrylate; (ii) carboxylic acid derivatives of alpha beta-unsaturated amide derivatives containing OH groups, for example, N-hydroxymethyl acrylamide; (iii) unsaturated alcohols.

With regard to olefinically unsaturated monomers having a blocked amine group which may be de-blocked to give an epoxy-reactive amine group, it is particularly preferred that such amine functionality be introduced into the dispersion by an imination reaction between an alkylene imine and a polymer having carboxylic acid functional groups, such groups have already been introduced by using an olefinically unsaturated monomer having a carboxyl group when forming .the polymer as described above. The amount of alkylene imine, for example propylene imine, used should be sufficient to iminate the desired proportion of the carboxyl groups to aminoalkyl ester groups. Preferably the amount used should be sufficient to iminate about 5% to 95%, more preferably 20% to 80%, of the carboxyl groups in the precursor polymer. The imination technique used is well-known in the art, and in this way reactive amine groups can be formed from carboxyl groups in the dispersion.

In a preferred embodiment component (c) comprises at least one, preferably 1, 2 or 3, olefinically unsaturated monomers having one or more of the following:
(i) a carboxy group such that epoxy-reactive carboxyl groups are provided in the resulting polymeric product;
(ii) a hydroxyl group such that epoxy-reactive hydroxyl groups are provided in the resulting polymeric product; and
(iii) a blocked amine group such that a blocked amine group is provided in the resulting polymer which is capable of being de-blocked (i.e. the blocking group removed) to give an epoxy reactive amine group.

For the purpose of this invention an "aqueous dispersion" means a dispersion (e.g. emulsion or suspension) of the polymer in an aqueous medium of which water is the principle component, sometimes referred to as a latex when the particles are small enough to be colloidally dispersed. Minor amounts of organic liquids, for example organic solvents may optionally be present.

The level of "total solids" (i.e. total amount of polyester, polyurethane and polymeric product) in the dispersion of the invention may be between 10 and 65% by weight of the total weight of the dispersion.

The phrase "at least one" preferably means from 1 to 4, more preferably 1 or 2.

It is to be understood that any reference to glass transition temperature relates to a polymeric product in which any conversion of carboxyl or amine-blocked groups to amine groups has been carried out.

The selected range of Tg for the polymeric product of the invention dispersion, i.e. the polymer made from polymerisation after any required conversion of groups thereon and including the encapsulated epoxy compound if present, can be achieved by appropriate selection of the components used in the polymerisation and their relative proportions. The selected Tg allows excellent storage stability for the resulting aqueous dispersion since the maximum storage temperature to which the dispersion, or a coating formulation made therefrom, is exposed can be chosen so as to be below the Tg of the polymeric product, thus facilitating (we believe) colloidal stability. It is also possible to ensure (by an appropriate choice of epoxy and epoxy-reactive groups) that any selected Tg in this range is below the minimum temperature or which curing is likely to occur to any noticeable degree (the effective curing temperature), and this (we believe) avoids a significant level of premature crosslinking.

Hence the nature of the monomers and epoxy compound employed in the preparation of the dispersion of the invention and the relative proportions are such that the defined range of glass transition temperature of the polymeric particles in the dispersion ensures (in particular) that crosslinking does not take place in the dispersion at room temperature or, for some embodiments, even at relatively high storage temperatures, for example up to about 50° C. Similarly, colloidal stability of a dispersion latex can be maintained at room or reasonably elevated temperatures. Nevertheless, when a film is formed on a substrate by evaporation of water from a coating dispersion according to the invention, or a coating formulation made from it, effective cross-linking of the polymer chains occurs at the desired curing temperature which may, depending upon the choice of epoxy groups and epoxy-reactive groups, be usefully lower than the conventional curing temperature for polymeric storing finishes.

An important feature of the present invention is that highly reactive combinations of epoxy-functional groups and epoxy-reactive groups can be utilised owing to the fact that, by the choice of the glass transition temperature and MFT of the polymer system within the defined range, the possibility of premature cross-linking in the aqueous latex (or formulations based on the aqueous dispersion) is greatly reduced. Thus, by choosing reactive combinations, curing temperatures as low as 70° C. can be achieved with commercially acceptable rates of cure. Examples of such reactive systems are glycidyl epoxy ester/amine systems. One particularly preferred combination is that in which the epoxy groups are derived from glycidyl methacrylate and the epoxy reactive groups are amine groups derived from imitating polymerised carboxylic acid-containing units as described above.

The aqueous curable polymer dispersion according to the invention may contain a coalescing solvent, for example a glycol ether, a glycol ether acetate, in particular butoxy ethanol, in addition to the polyester and/or polyurethane, preferably in a weight percent of 1% to 20% relative to the total weight of polymeric product.

With regard to the polymerisation to form the polymeric product, it is preferred to add a suitable surfactant to aid emulsification when emulsion polymerisation is the polymerisation technique employed. We prefer to use a known anionic and/or a non-ionic surfactant.

The free-radical initiator may be any suitable initiator known in the art, for example ammonium persulphate.

A buffering agent, e.g. sodium bicarbonate, may be used to control the pH during polymerisation.

Various additives commonly used in the formulation of coating compositions made from polymer dispersions may be added to the dispersions produced by the process of the present invention. For example, plasticisers, levelling agents, de-roamers, thickeners, pigments, fillers, wetting agents, anti-septic and antifungal agents may be added as necessary to the dispersions described herein.

The invention also provides an aqueous thermally-curable coating composition derived from an aqueous dispersion as hereinbefore defined.

The invention also includes a process for coating a substrate comprising applying thereto a dispersion according to the invention, evaporating water therefrom and heating the substrate to form a film thereon.

Products of the invention also include a film or cross-linked surface coating obtained or obtainable by evaporation of water from and heating of a dispersion or composition according to the invention and any substrate coated with the film or cross-linked surface coating.

Blends of two or more dispersions according to the invention can of course be used for the provision of crosslinked coatings.

The present invention is useful for preparing durable, solvent-resistant and hard surface coatings on many substrates, particularly those of industrial and architectural importance requiring curing by the application of heat. Thus surfaces (i.e. substrates) such as stone, wood, concrete, brick, ceramic tile and temperature resistant plastics may be coated, but the compositions made according to the present invention are particularly suited to the coating of various metals. Specific examples of the latter are storing finishes on metallic articles, for example steel drum linings.

Coating formulations made with the dispersions of the invention provide a number of advantages over the conventional compositions for storing finishes. For example they possess a low MFT, excellent pot-life and long-term storage properties (i.e. no significant pre-crosslinking occurs) even at relatively high storage temperatures, for example up to 50° C. The formulations are one-pack systems which make them more convenient in use than the majority of prior art formulations which are usually supplied in two-pack form for comparable applications. The dispersions of the invention are cross-linkable (i.e. curable) at temperatures significantly lower than those required for conventional storing finishes, while still producing a durable and hard finish. Also a shorter time of heating is generally possible with the formulations of the invention to achieve comparable properties of the cured coating. Additionally, the present water-based formulations are safer than those which emit toxic formaldehyde during curing.

The glass transition temperature (Tg) of a polymer system of the invention dispersion may, if wholly derived from the polymerisation of olefinically unsaturated monomers (i.e. not including multifunctional epoxy compound) my be determined empirically by means of the Fox equation. Thus the Tg, in degrees Kelvin, of a copolymer having "n" copolymerised comonomers is given by the weight fractions W of each comonomer type and the Tg's of the homopolymers (in degrees Kelvin) derived from each comonomer according to the equation:

$$\frac{1}{T_g} = \frac{W_1}{T_{g_1}} + \frac{W_2}{T_{g_2}} + \ldots \frac{W_n}{T_{g_n}}$$

Experimental measurement of Tg may be effected by the use of dynamic mechanical thermal analysis (DMTA) at 1 $H_z$, or differential scanning calorimetry (DSC).

The invention is illustrated by, but not limited to, the following Examples. All parts, percentages and ratios are expressed on a weight basis, unless otherwise specified.

General Procedure for Preparation and Testing of Dispersions Exemplified (Including Comparative Dispersions)

All preparations of polymeric products were conducted in a 2 litre reaction vessel equipped with a stirrer, reflux condenser, thermometer and nitrogen purge. A thermostatted water bath was used to heat and reaction vessel. The respective ingredients for the polymerisations were added as indicated in the Examples. At the end of the polymerisation all dispersions were adjusted to a pH of 8–9 using 25% aqueous ammonia solution (unless stated otherwise). Minimum film forming temperatures (MPT) of the dispersions are shown in Table 1. The MFT was measured after 30 days storage at 20° C. and at 40° C. for the dispersions. A Sheen MFT bar SS3000 was used to measure the MFT. Table 1 also shows the empirical and experimental (DMTA, 1 $H_z$ glass transition temperature (Tg) values.

The level of crosslinking was measured using the methyl ethyl ketone (MEK) double-rub technique. The double-rub test assesses the solvent resistance of a film and is effected by rubbing the film to and fro with a rag soaked with MEK until the substrate shows through or until 200 double rubs have been performed without the substrate showing through (quoted as >200 double rubs). Films of the respective dispersions for the double rub test were cast on steel panels at room temperature. The films were then stored as indicated in Table 1 and the MEK double rub test was performed.

EXAMPLE 1

Stage a)—Preparation of polyurethane dispersion

Poly(propylene glycol) 1000 (32.12 g), 1,4-cyclohexane dimethanol (4.16 g) and N-methyl-2-pyrrolidone (NMP) were placed in a vessel under nitrogen and stirred to homogenise. The mixture was heated to 40° C. and a solution of toluene diisocyanate (28.04 g) in NMP added over 1 hour, during which the temperature rose to 90° C. A solution of 2,2-bis-hydroxymethyl propionic acid (5.68 g) in NMP were added over 1 hour at a constant temperature of 60° C. The mixture was cooled to 40° C. and triethylamine (4.5 g) was added to give a prepolymer. The total amount of NMP used was 30 g.

The prepolymer melt was dispersed in water and chain extended using hydrazine (2.64 g) and filtered through a cloth of pore size 53 μm to give a polyurethane dispersion having a solids content of 28% and a pH of 9.5.

Stage b)—Preparation of a polymeric product by free-radical initiated polymerisation A monomer mixture (405.33 g) was prepared consisting of Styrene (99.6 g), n-butylmethacrylate (148.8 g), n-butyl acrylate (31.6 g), glycidyl methacrylate (100 g), β-carboxyethyl methacrylate (20 g) and surfactant (Aerosol OT 75, 5.33 g).

40.53 g of the monomer mixture was added to a mixture of water (589.37 g), surfactant (Nansa AS40, 2.1 g), sodium hydrogen carbonate (1.2 g) and ammonium persulphate initiator (2.0 g) under nitrogen at 45° C. The mixture was heated to 85° C.±2° C. and the onset of polymerisation was marked by an exotherm of ca 3°–5° C.

The remaining monomer mixture (364.8 g) was added over 1½ hour, maintaining the temperature at 85° C.±2° C., and the mixture stirred for a further ½ hour after the addition was complete. The resultant product was filtered through a gauze of pore size 53 μm to give a polymeric product having a solids content of 40% and pH of 4.5. The pH was finally adjusted to pH 8 using 25% ammonia solution.

Stage c)—Preparation of the aqueous curable polymer dispersion

The polyurethane dispersion prepared as in Stage a) (122 g, 30 parts) was added to a stirred polymeric product prepared as in Stage b) (200 g, 70 parts) over 5 minutes. After 15 minutes stirring the resultant mixture was filtered through a gauze of pore size 53 μm to give an aqueous curable polymer dispersion having a solids content of 35.5% and a pH of 8.

EXAMPLE 2

Stage a)—Preparation of a polymeric product by free-radical initiated polymerisation A monomer mixture (400 g) was prepared consisting of Styfete (120 g), n-butylmethacrylate (112 g), 2-ethylhexylacrylate (40 g), glycidyl methacrylate (100 g), methacrylic acid (14 g) and acrylic acid (14 g).

40 g of the monomer mixture was added to a mixture of water (466.5 g), surfactant (Nansa AS40, 3.16 g) and ammonium persulphate initiator (2.0 g) under nitrogen at 45° C. The mixture was heated to 80° C.±2° C. and the onset of polymerisation was marked by an exotherm of ca 5° C.

The remaining monomer mixture (360 g) was added over 1½ hour, maintaining the temperature at 85° C.±2° C., and the mixture stirred for a further ½ hour after the addition was complete. 5 minutes after the addition of remaining monomer mixture began a solution of a surfactant (Nansa AS40, 7.89 g) in water (120 g) was also added over a period of 80 minutes. The resultant product was filtered through a gauze of pore size 53 μm to give a polymeric product having a solids content of 40%. The pH was finally adjusted to pH 8 using 25% ammonia solution.

Stage b)—Preparation of an aqueous curable polymer dispersion

A polyurethane dispersion (NEOKEZ R972, available from ZENECA Limited, 50 parts) was added to the stirred polymeric product of Stage a) (50 parts) over 5 minutes. After 15 minutes stirring the resultant mixture was filtered through a gauze of pore size 53 μm to give an aqueous curable polymer dispersion having a solids content of 36.5% and a pH of 8.

EXAMPLE 3

The method of Example 2 stages a) and b) were repeated except that in place of NEOREZ R972 there was used NEOREZ K981 as polyurethane.

The resultant aqueous curable polymer dispersion had a solids content of 35.5% and a pH of 8.2.

EXAMPLE 4

Stage a)—Preparation of polymeric product having amine groups

A sample of a polymeric product (200 g) was prepared as described in Example 2, Stage a) except that the pH was adjusted to pH 6.5. The product was warmed to 33° C. and propyleneimine (2.9 g) added over 45 minutes. After stirring for 2 hours the mixture was cooled to 20° C. and filtered through a gauze of pore size 53 μm to give a polymeric product of pH 10, having a solids content of 42%.

Stage b)—Preparation of aqueous curable polymer dispersion

A polyurethane dispersion prepared as described in Example 1, Stage a) (50 parts) was added to a stirred polymeric product prepared as described in Example 4, Stage a) (50 parts) over 5 minutes. After 15 minutes stirring the resultant mixture was filtered through a gauze of pore size 53 μm to give an aqueous curable polymer dispersion having a solids content of 34% and a pH of 8.5.

EXAMPLE 5

The method of Example 1, Stage c), was repeated except that in place of the polymeric product from Stage b) (70 parts) there was used the polymeric product from Example 2, Stage a) (70 parts).

The resultant aqueous curable polymer dispersion had a solids content of 35.5% and a pH of 8.

TABLE 1

| Film from | Glass transition temperature (Tg °C.) | | MFT (°C.) | | MEK Double Rubs 120° C., 30 minutes cure | |
|---|---|---|---|---|---|---|
| | Empirical | Experimental DMTA, 1 Hz | Stored at 20° C. for 30 days | Stored at 40° C. for 30 days | As prepared | Stored at 40° C. for 30 days |
| Example 1, Stage b) (PU absent) | 50 | 54 | 52 | — | >200 | >200 |
| Example 1, Stage c) (PU present) | — | — | less than 5 | less than 5 | >200 | >200 |
| Example 2, Stage a) (PU absent) | 50 | 52 | 50 | — | >200 | — |
| Example 2, Stage b) (PU present) | — | — | less than 5 | less than 5 | >200 | >200 |
| Example 3 (PU present) | — | — | less than 5 | less than 5 | >200 | >200 |
| Example 4, Stage a) (PU absent) | 50 | 55 | 53 | — | >200 | — |
| Example 4, Stage b) (PU present) | — | — | less than 5 | less than 5 | >200 | >200 |
| Example 5 (PU present) | — | — | less than 5 | less than 5 | >200 | >200 |

"PU" means polyuretane

EXAMPLES 6 AND 7

Stowed enamel finishes were prepared by formulating the aqueous curable polymer dispersions from Example 1, Stage c) or Example 5 as follows to give present Examples 6 and 7 respectively:

| Premix | | |
|---|---|---|
| (1) | Water | 1.41 g |
| (2) | Drewplus 4201 | 0.08 g |
| (3) | Disperse AYD W22 | 0.22 g |
| (4) | 'Borchigel' L75 | 0.30 g |
| (5) | Butoxyethanol | 1.40 g |
| (6) | 'Surfynol' 104H | 0.30 g |
| (7) | Amp 90 | 0.33 g |
| (8) | Sodium Nitrite (30%) | 0.47 g |
| Pigments | | |
| (9) | Kronos 2190 | 25.60 g |
| Let Down | | |
| (10) | Aqueous curable polymer dispersion from Example 1, Stage c) or Example 5 | 69.89 g |

PVC = 17.69

Method

To water ((1), 1.41 g) was added (10) (34.99 g) followed by (2), (3), (4), (6) and (7). The mixture was stirred slowly and (8) and (9) were added, the mixture stirred well, and (5) was added. The mixture was dispersed at high speed and the reminder of 10 (34.99 g) added. The mixture was passed through a bead mill and applied to steel panels using a K-bar (100 μm wet film thickness) and cured by heating to 120° C. for ½ hour. The resultant stowed enamel finishes were found to posses the properties shown in Table 2.

TABLE 2

| Example Number | MEK Double Rubs | Petrol Soak | Surface Hardness König Sec. | Conical Mandril Flexibility |
|---|---|---|---|---|
| 6 | >200 | Pass | 130 | Pass |
| 7 | >200 | Pass | 150 | Pass |

*Cure conditions 120° C., 30 minutes.

We claim:

1. An aqueous curable polymer dispersion which comprises a polyester and/or polyurethane and polymeric product having a Tg within the range 25° C. to 100° C. obtainable by subjecting to a free-radical-initiated polymerisation process a mixture comprising the components
   (a) at least one polymerisable olefinically unsaturated monomer which does not have an epoxy-functional group or an epoxy-reactive group or a group which is subsequently converted to an epoxy-reactive group;
   (b) at least one polymerisable olefinically unsaturated monomer having at least one epoxy-functional group and/or at least one multi-functional epoxy compound having an average of 2 or more epoxy groups per molecule and which is not derived from the polymerisation of an olefinically unsaturated monomer system: and
   (c) at least one olefinically unsaturated monomer having one or more of the following:
      (i) at least one carboxyl group such that epoxy-reactive amine groups are provided in the resulting polymeric product by conversion subsequent to polymerisation of at least some of the carboxyl groups to epoxy-reactive amine groups;
      (ii) at least one hydroxyl group such that epoxy-reactive hydroxyl groups are provided directly in the resulting polymeric product; and
      (iii) at least one blocked amine group which is deblocked subsequent to polymerisation to provide epoxy-reactive amine groups in the resulting polymeric product and wherein:
   (d) the level of component (b) based on the sum of components (a), (b), and (c), is from 2 to 48 weight %;
   (e) the level of component (a) based on the sum of components (a), (b) and (c) is from 50 to 96 weight %; and
   (f) the level of component (c) based on the sum of components (a), (b) and (c) is from 2 to 40 weight %.

2. An aqueous curable polymer dispersion according to claim 1 wherein component (a) is 1,3-butadiene, isoprene, styfete, divinyl benzene, acrylonitrile, methacrylonitrile, a vinyl halide, a vinyl ester, a heterocyclic vinyl compound or an alkyl ester of a mono-olefinically unsaturated dicarboxytic acid.

3. An aqueous curable polymer dispersion according to claim 1 wherein component (a) is of formula $$CH_2=CR^1COOR^2$$

where $R^1$ is H or methyl and $R^2$ is alkyl of 1 to 20 carbon atoms or cycloalkyl.

4. An aqueous curable polymer according to any one of claims 1 to 3 wherein Component (c) comprises at least one olefinically unsaturated monomer having one or more of the following:

(i) a hydroxyl group such that epoxy-reactive hydroxyl groups are provided in the resulting polymeric product; and (ii) a blocked amine group such that a blocked amine group is provided in the resulting polymer which is capable of being de-blocked (i.e. the blocking group removed) to give an epoxy reactive amine group.

5. An aqueous curable polymer dispersion according to any one of the preceding claims wherein the multi-functional epoxy compound is soluble in component (a) and/or (c).

6. An aqueous curable polymer dispersion according to and one of the preceding claims which contains a coalescing solvent.

7. An aqueous curable polymer dispersion according to claim 1 wherein the polyurethane and polyester contain carboxylate or sulphonate groups.

8. An aqueous curable polymer dispersion according to any one of claims 1 to 7 wherein the mixture comprising components (a), (b) and (c) contains a surfactant.

9. An aqueous curable polymer dispersion according to claim 1 wherein the components (a), (b) and (c) are respectively as follows:

Component (a) comprises 1,3-butadiene, isoprene, styrent, divinyl benzene, acrylonitrile, methacrylonitrile, a vinyl halide, a vinyl ester or an ester of acrylic acid or methacrylic acid of the formula:

$$CH_2=CR^1COOR^2$$

where $R^1$ is H or methyl and $R^2$ is alkyl of 1 to 20 carbon atoms or cycloalkyl;

Component (b) comprises glycidyl acrylate, glycidyl methacrylate, 3,4-epoxy cyclohexylmethylacrylate, cyclohexyl methylacrylate, allyl glycidyl ether or allyl or vinyl 3,4-epoxycyclohexane carboxylate.

Component (c) comprises an olefinically unsaturated monomer having one or more of the following
(i) a hydroxyl group such that epoxy-reactive hydroxyl groups are provided in the resulting polymeric product; and
(ii) a blocked amine group such than a blocked amine group is provided in the resulting polymer which is capable of being de-blocked (i.e. the blocking group removed) to give an epoxy reactive amine group.

10. A process for coating a stone, wood, concrete, brick, ceramic tile or temperature resistant plastic substrate comprising applying thereto an aqueous curable polymer dispersion, evaporating water therefrom and heating the substrate to form a film thereon; wherein the dispersion comprises a polyester and/or polyurethane and polymeric product having a Tg within the range 25° C. to 100° C. obtainable by subjecting to a free-radical-initiated polymerisation process a mixture comprising the components:

(a) at least one polymerisable olefinically unsaturated monomer which does not have an epoxy-functional group or an epoxy-reactive group or a group which is subsequently converted to an epoxy-reactive group;

(b) at least one polymerisable olefinically unsaturated monomer having at least one epoxy-functional group and/or at least one multi-functional epoxy compound having an average of 2 or more epoxy groups per molecule and which is not derived from the polymerisation of an olefinically unsaturated monomer system; and (c) at least one olefinically unsaturated monomer having one or more of the following:
(i) at least one carboxyl group such that epoxy-reactive carboxyl groups are provided directly in the resulting polymeric product and/or such that epoxy-reactive amine groups are provided in the resulting polymeric product by conversion subsequent to polymerisation of at least some of the carboxyl groups to epoxy-reactive amine groups;
(ii) at least one hydroxyl group such that epoxy-reactive hydroxyl groups are provided directly in the resulting polymeric product; and
(iii) at least one blocked amine group which is deblocked subsequent to polymerisation to provide epoxy-reactive amine groups in the resulting polymeric product and wherein:

(d) the level of component (b) based on the sum of components (a), (b), and (c), is from 2 to 48 weight %;
(e) the level of component (a) based on the sum of components (a), (b) and (c) is from 50 to 96 weight %; and
(f) the level of component (c) based on the sum of components (a), (b) and (c) is from 2 to 40 weight %.

11. A film obtained by evaporation of water from and heating of a dispersion according to claim 1.

12. An aqueous curable polymer dispersion according to claim 1 which comprises a polyurethane and a polymeric product having a Tg within the range 25° C. to 100° C. obtainable by subjecting to a free-radical-initiated polymerization process, a mixture comprising:
(a) an alkyl acrylate or methacrylate;
(b) glycidyl acrylate or methacrylate; and
(c) acrylic or methacrylic acid.

13. A dispersion according to claim 12 wherein (a) is n-butyl methacrylate; (b) is glycidyl methacrylate; and (c) is acrylic acid.

14. A process according to claim 10 wherein the substrate is concrete.

15. A process for coating a substrate comprising applying thereto an aqueous curable polymer dispersion and evaporating water therefrom and heating the substrate to form a film thereon, wherein the dispersion comprises a polyester and/or polyurethane and polymeric product having a Tg within the range 35° C. to 70° C. obtainable by subjecting to a free-radical-initiated polymerisation process a mixture comprising the components.

(a) at least one polymerisable olefinically unsaturated monomer which does not have an epoxy-functional group or an epoxy-reactive group or a group which is subsequently converted to an epoxy-reactive group;

(b) at least one polymerisable olefinically unsaturated monomer having at least one epoxy-functional group and/or at least one multi-functional epoxy compound having an average of 2 or more epoxy groups per molecule and which is not derived from the polymerisation of an olefinically unsaturated monomer system; and (c) at least one olefinically unsaturated monomer having one or more of the following:
(i) at least one carboxyl group such that epoxy-reactive carboxyl groups are provided directly in the resulting polymeric product and/or such that epoxy-reactive amine groups are provided in the resulting polymeric product by conversion subsequent to polymerisation of at least some of the carboxyl groups to epoxy-reactive amine groups;
(ii) at least one hydroxyl group such that epoxy-reactive hydroxyl groups are provided directly in the resulting polymeric product; and
(iii) at least one blocked amine group which is deblocked subsequent to polymerisation to provide epoxy-reactive amine groups in the resulting polymeric product and wherein:

(d) the level of component (b) based on the sum of components (a), (b), and (c), is from 2 to 48 weight %;
(e) the level of component (a) based on the sum of components (a), (b) and (c) is from 50 to 96 weight %; and
(f) the level of component (c) based on the sum of components (a), (b) and (c)is from 2 to 40 weight %.

16. A process according to claim 15 wherein component (a) is 1,3-butadiene, isoprene, styrene, divinyl benzene, acrylonitrile, methacrylonitrile, a vinyl halide, a vinyl ester, a heterocyclic vinyl compound or an alkyl ester of a mono-olefinically unsaturated dicarboxylic acid.

17. A process according to claim 15 wherein component (a) is of formula $$CH_2=CR^1COOR^2$$

where $R^1$ H or methyl and $R^2$ is alkyl of 1 to 20 carbon atoms of cycloalkyl.

18. A process according to claim 15 wherein Component (c) comprises at least one olefinically unsaturated monomer having one or more of the following:

(i) a carboxy group such that epoxy-reactive carboxyl groups are provided in the resulting polymeric product;

(ii) a hydroxyl group such that epoxy-reactive hydroxyl groups are provided in the resulting polymeric product; and (iii) a blocked amine group such that a blocked amine group is provided in the resulting polymer which is capable of being de-blocked (i.e. the blocking group removed) to give an epoxy reactive amine group.

19. A process according to claim 10 or 15 wherein the components (a), (b) and (c) are respectively as follows:

Component (a) comprises 1,3-butadiene, isoprene, styrene, divinyl benzene, acrylonitrile, methacrylonitrile, a vinyl halide, a vinyl ester or an ester of acrylic acid or methacrylic acid of the formula:

$$CH_2 = CR^1OOR^2$$

where $R^1$ is H or methyl and $R^2$ is alkyl of 1 to 20 carbon atoms or cycloalkyl;

Component (b) comprises glycidyl acrylate, glycidyl methacrylate, 3,4-epoxy cyclohexylmethylacrylate, cyclohexyl methylacrylate, allyl glycidyl ether or allyl or vinyl 3,4-epoxycyclohexane carboxylate.

Component (c) comprises an olefinically unsaturated monomer having one or more of the following (i) a carboxy group such that epoxy-reactive carboxyl groups are provided in the resulting polymeric product;

(ii) a hydroxyl group such that epoxy-reactive hydroxyl groups are provided in the resulting polymeric product; and (iii) a blocked amine group such that a blocked amine group is provided in the resulting polymer which is capable of being deblocked (i.e. the blocking group removed) to give an epoxy reactive amine group.

20. A process according to claim 15 wherein the substrate is a metal.

21. A process according to claim 20 wherein the substrate is a steel drum.

22. A process for coating a substrate comprising applying thereto a dispersion as defined in claim 15, evaporating water therefrom and heating the substrate to form a film thereon.

* * * * *